United States Patent
Amin et al.

(10) Patent No.: US 7,325,415 B2
(45) Date of Patent: Feb. 5, 2008

(54) PROCESS AND DEVICE FOR PRODUCTION OF LNG BY REMOVAL OF FREEZABLE SOLIDS

(75) Inventors: Robert Amin, Salter Point (AU); Anthony Frederick Kennaird, Leeming (AU)

(73) Assignee: Cool Energy Limited, West Perth WA (AU)

( * ) Notice: Subject to any disclaimer, the term of this patent is extended or adjusted under 35 U.S.C. 154(b) by 354 days.

(21) Appl. No.: 10/501,770

(22) PCT Filed: Jan. 17, 2003

(86) PCT No.: PCT/AU03/00050

§ 371 (c)(1),
(2), (4) Date: Nov. 17, 2004

(87) PCT Pub. No.: WO03/062725

PCT Pub. Date: Jul. 31, 2003

(65) Prior Publication Data

US 2005/0072186 A1    Apr. 7, 2005

(30) Foreign Application Priority Data

Jan. 18, 2002  (AU) .................................... PS0021
Aug. 12, 2002  (AU) .............................. 2002950681

(51) Int. Cl.
*B01D 9/04* (2006.01)

(52) U.S. Cl. .............................. 62/541; 62/532; 62/541
(58) Field of Classification Search ................... 62/532, 62/537, 541, 544
See application file for complete search history.

(56) References Cited

U.S. PATENT DOCUMENTS 3,236,057 A    2/1966  Hashemi-Tafreshi (Continued)

FOREIGN PATENT DOCUMENTS

JP    10-121071 A    5/1998

(Continued)

OTHER PUBLICATIONS

Supplementary European Patent Office Search Report.

*Primary Examiner*—William C Doerrler
(74) *Attorney, Agent, or Firm*—Buchanan Ingersoll & Rooney PC

(57) ABSTRACT

Novel processes and devices for the removal of freezable species such as carbon dioxide, water and heavy hydrocarbons from a natural gas feed stream during liquefaction to produce LNG are disclosed. The freezable species are able to be removed as a solid, avoiding the costly step of pretreatment to remove the freezable species from the natural gas feed stream prior to the liquefaction stage. The freezable species may be removed on a continuous basis being separated as solids following liquefaction of the natural gas feed stream with subsequent separation of the solids. The solid freezable species may then be liquefied on a continuous basis if required with natural gas recycled to the process. Continuous removal of the freezable species from the natural gas feed stream is achievable by maintaining cooling and separation apparatus at the same working pressure. Advantageously, at least part of the cooling vessel is constructed from a material having a low thermal conductivity which discourages formation of the solids of the freezable species on the walls of the cooling vessel.

52 Claims, 4 Drawing Sheets

U.S. PATENT DOCUMENTS

| | | | |
|---|---|---|---|
| 3,376,709 A * | 4/1968 | Dickey et al. ................ | 62/637 |
| 3,398,544 A | 8/1968 | Crownover | |
| 3,724,225 A | 4/1973 | Mancini et al. | |
| 4,001,116 A | 1/1977 | Selcukoglu | |
| 4,187,689 A * | 2/1980 | Selcukoglu et al. ......... | 62/48.2 |
| 4,698,080 A | 10/1987 | Gray et al. | |
| 5,615,561 A | 4/1997 | Houshmand et al. | |
| 5,681,450 A * | 10/1997 | Chitnis et al. ............... | 208/113 |
| 5,715,702 A * | 2/1998 | Strong et al. ................ | 62/434 |
| 5,819,555 A * | 10/1998 | Engdahl ...................... | 62/637 |
| 6,053,007 A | 4/2000 | Victory et al. | |
| 6,581,409 B2 * | 6/2003 | Wilding et al. ............... | 62/613 |

FOREIGN PATENT DOCUMENTS

| | | |
|---|---|---|
| JP | 2001-324261 A | 11/2001 |
| WO | 99/01706 A1 | 1/1999 |
| WO | 00/36350 A2 | 6/2000 |
| WO | 01/69149 A1 | 9/2001 |

* cited by examiner

PROCESS AND DEVICE FOR PRODUCTION OF LNG BY REMOVAL OF FREEZABLE SOLIDS

FIELD OF THE INVENTION

The present invention relates to a process and device for the removal of freezable species such as carbon dioxide, water and heavy hydrocarbons from a natural gas feed stream and more particularly to a process for the removal of freezable species from the natural gas feed during the liquefaction of the natural gas to produce LNG.

BACKGROUND OF THE INVENTION

In conventional LNG plants, heat transfer for cooling a natural gas feed stream sufficiently to form a liquid is effected in a heat exchanger. Natural gas can contain a wide range of compositions of species which are capable of forming solids during the cryogenic process of liquefying natural gas. Such species are referred to throughout this specification as "freezable species" and the solids formed of the freezable species are referred to as "freezable solids".

Freezable species which are not removed prior to entering the cryogenic LNG cooling vessel precipitate and accumulate on the cold surfaces of the heat exchangers and other equipment, eventually rendering these items inoperable. When fouling has reached a sufficient level, the cooling vessel must be taken off-line for the fouling to be removed. In the process the cooling vessel, baffles or pipework can be damaged which only encourages further fouling in the next production cycle. Moreover, solids condensing on metal surfaces form an insulating film reducing thermal efficiency of the heat exchanger.

In a conventional LNG facility, pre-treatment of the natural gas is required to remove the freezable species prior to the natural gas feed stream being directed to the cooling stages to cause liquefaction. In a typical natural gas, the $CO_2$ composition can range between 0.5% to 30% and can be as high as 70% in commercially viable reservoirs like Natuna. In a conventional LNG facility, the level of $CO_2$ present in the natural gas is typically reduced down to the level of 50 to 125 ppm prior to the natural gas feed stream being directed to liquefaction. Another of the freezable species, namely hydrogen sulphide ($H_2S$), is normally removed down to a level of 3.5 mg/Nm$^3$ prior to the natural gas feed stream being allowed to enter the liquefaction stage. One of the methods typically used to remove the freezable species from the natural gas feed stream is a chemical reaction using reversible absorption processes such as absorption with an amine solvent.

This is an expensive and complex process and commonly encounters operational problems such as foaming, corrosion, blocked filters, amine degradation, and losses of amine, water and hydrocarbons. The process also consumes energy to regenerate and pump the solvent Treated gas from the amine system will be water saturated and needs to be dried to less than 1 ppm prior to liquefaction. This is normally achieved by using fixed-bed solid adsorbents such as molecular sieves.

The natural gas feed stream is sometimes pre-treated to partially remove water along with some heavy hydrocarbons by means of a pre-cooling cycle from the main refrigeration unit. Alternatively, Joule-Thomson cooling can be used if excess feed gas pressure is available. Care must however be taken to keep the gas above the hydrate formation temperature. This is again a relatively expensive process. Large insulated pressure vessels are required along with a regeneration system. Regeneration of the molecular sieve is required and this consumes energy to heat the gas. The regenerated gas must be heated prior to entering the "wet" adsorption unit, then cooled to remove water before it is recycled (usually compressed) to the inlet of the duty adsorption unit. If a molecular sieve is used to remove $CO_2$, the regeneration gas must be disposed of or used as fuel gas.

Heavy hydrocarbons (typically $C_6$+) are typically partially removed along with water as explained above. Where further removal is required, a cryogenic distillation column is required, with cooling provided from the main refrigerant cycle. Again, this can be an expensive and complex process, especially if the removed components are required for refrigerant make-up in a mixed refrigerant cycle.

An attempt has been made to develop a process for removing the freezable species during the liquefaction stage as described in WO 99/01706 (Cole et al. The distallative separation process of Cole et al includes a controlled freezing zone in which the freezable species both solidify and subsequently melt prior to distallative separation in the bottom half of the column. The freezable species are removed in the form of a liquid via a bottoms product enriched in the freezable species.

There are no known techniques for removing the freezable species during liquefaction with the freezable species remaining in solid form.

SUMMARY OF THE INVENTION

According to a first aspect of the present invention, there is provided a method of removal of the freezable species from the natural gas feed stream, the method comprising the steps of:

cooling the feed stream in a cooling vessel to produce pressurised LNG in a manner such that the freezable species solidify forming a slurry with the pressurised LNG; and, removing the slurry from the cooling vessel whilst maintaining the freezable species as a solid.

The step of cooling the feed stream to produce pressurised LNG is referred to in the specification as "liquefaction". The temperature and pressure at which liquefaction is conducted is not a critical parameter of the present invention, but by definition, any of the species capable of forming solids during the liquefaction of a natural gas to form LNG will form solids. The freezable species may include but are not limited to $CO_2$ and $H_2S$.

Preferably, the step of cooling is conducted in a manner such that the freezable species solidify away from a wall of the cooling vessel. Throughout this specification the zone in which the freezable species solidify within the cooling vessel is referred to as the "solidification zone". One way of promoting the formation of the solidification of the freezable species away from the walls of the cooling vessels is to maintain a temperature gradient within the cooling vessel such that the temperature towards the centre of the cooling vessel is less than the temperature at the wall of the cooling vessel. In practice, one way of achieving this is to use a material of construction for at least the internal wall of the cooling vessel surrounding the solidification zone from a material having a low thermal conductivity.

Preferably, the process further comprises the step of separating the solids of the freezable species from the slurry. More preferably, the step of removing the slurry from the cooling vessel is conducted simultaneously with the step of separating the freezable species from the slurry.

According to a second aspect of the present invention, there is provided a process for the continuous removal of a freezable species from a natural gas feed stream comprising the steps of:

cooling the feed stream in a cooling vessel to produce pressurised LNG in a manner such that the freezable species solidify forming a slurry with the pressurised LNG; and, separating the solids of the freezable species from the slurry, wherein the step of cooling and the step of separating are conducted at the same working pressure.

When the steps of cooling-separating are conducted at the same working pressure, ie the pressure in use, it is possible to run the process in a continuous manner as opposed to a batch operation. The word "continuous" does not imply that the process would at no time be halted. In any process, it will be necessary to stop production for various reasons, for example maintenance.

Preferably, the process for continuous removal of the freezable species further comprises the step of heating the separated solids of the freezable species to form a liquid of the freezable species and the steps of cooling, separating and heating are conducted at the same working pressure.

It is to be understood that the "same working pressure" is used to describe the situation whereby the pressure in use is adjustably maintained such that all three stages are at all times at equilibrium. The working pressure itself may vary.

It is highly preferable that the pressure is maintained at all times below the triple-point pressure of the freezable species. This is done to ensure that a vapour phase of the freezable species is not formed, which would require a further separation step before the natural gas vapour formed during the step of heating the solids of the freezable species could be recycled to the process.

Preferably, the process as defined in either one of the first or second aspects of the present invention further comprises the step of recycling to the cooling vessel LNG from which the freezable species has been separated. Preferably, the process also comprises the step of recycling to the cooling vessel natural gas from which the freezable species has been separated during the step of heating of the slurry to liquefy the freezable species.

Preferably, the process defined in either of the aspects described above further comprises the step of creating a vortex within the cooling vessel. Preferably, the vortex is created by stirring the slurry. Alternatively or additionally, the vortex may be created by introducing a fluid stream tangentially to the cooling vessel. Preferably, the fluid stream introduced tangentially to the cooling vessel is a stream of sub-cooled LNG. The stream of sub-cooled LNG may be the sub-cooled LNG stream recycled after separation of the freezable species from the slurry.

Preferably, the step of cooling comprises the step of isotropically expanding the feed stream.

Preferably, the step of cooling alternatively or additionally comprises the step of introducing a stream of sub-cooled LNG. Advantageously, the stream of sub-cooled LNG introduced to assist in the step of cooling may be the stream of recycled LNG separated from the slurry during the step of separating the solids of the freezable species.

According to a third aspect of the present invention, there is provided an apparatus for removing a freezable species from a natural gas feed stream, the apparatus comprising:

a cooling vessel having a solidification zone therewithin wherein that part of the cooling vessel that surrounds the solidification zone is constructed from a material having a low thermal conductivity;

an inlet for introducing the feed stream to the cooling vessel; and, an outlet for removing a slurry of solidified freezable species and pressurised LNG from the cooling vessel.

The solidification zone is defined above as that part of the cooling vessel within which the freezable species forms solids within the cooling vessel during cooling. The extent of the solidification zone will depend on the size of the cooling vessel, the temperature and pressure of operation of the cooling vessel and the particular freezable species present within the particular natural gas feed stream.

It is to be understood that while the entire cooling vessel may be constructed of a material having a low thermal conductivity, it is only necessary for the working of the present invention for that part of the cooling vessel that surrounds the solidification zone to be constructed from such a material. Moreover, it is the surface within the cooling vessel, ie the internal wall of the cooling vessel, thus must be constructed of the material having a low thermal conductivity to achieve the claimed result. Thus it is to be understood that the cooling vessel could be constructed of a material having a high thermal conductivity as the outer case of such a cooling vessel, provided that the internal part of the cooling vessel that surrounds the solidification zone is constructed with the material having a low thermal conductivity.

One of the advantages of constructing the material in such a way is that a thermal gradient is developed within the cooling vessel whereby the temperature towards the centre of the cooling vessel is at all times cooler than the temperature at the walls of the cooling vessel. The result of this is that the freezable solids form preferentially towards the centre of the cooling vessel and away from the walls of the cooling vessel, reducing or eliminating fouling of the cooling vessel due to solidification of the freezable species on the plant equipment itself.

Preferably, the apparatus further comprises a solid/liquid separator for separating the solidified freezable species from the slurry. More preferably, the separator is located at and/or defines the outlet. The separator may be one of a plurality of separators arranged in series or in parallel.

Preferably an expansion valve is located at and/or defines the inlet for introducing the feed stream to the cooling vessel. One suitable expansion valve is a Joule-Thompson valve for isotropically expanding the natural gas feed stream upon entering the cooling vessel. Introducing the natural gas in this way results in cooling of the natural gas feed stream.

Preferably, the apparatus further comprises a stirrer for creating a vortex within the cooling vessel in use. Alternatively or advantageously, the cooling vessel may further comprise a tangential inlet for introducing a fluid into the cooling vessel for creating a vortex within the cooling vessel in use. Preferably, the fluid stream introduced into the cooling vessel will be a stream of sub-cooled LNG. The sub-cooled LNG stream may be recycled from other stages of the process.

According to a fourth aspect of the present invention, there is provided an apparatus for continuously removing a freezable species from a natural gas feed stream the apparatus comprising:

a cooling vessel having a solidification zone therewithin wherein that part of the cooling vessel that surrounds the solidification zone is constructed from a material having a low thermal conductivity;

an inlet for introducing the feed stream to the cooling vessel;

an outlet for removing a slurry of solidified freezable species and pressurised LNG from the cooling vessel; and a solids collection vessel in fluid communication with the cooling vessel.

Maintaining the cooling vessel and the solids collection vessel in fluid or hydraulic communication will have the result that each of these vessels operates at the same working pressure.

Preferably, the apparatus further comprises a transfer means for transferring the slurry from the cooling vessel to the solids collection vessel.

Preferably, the transfer means is inclined at an angle. As the slurry travels via the inclined transfer means from the cooling vessel to the solids collection vessel, pressurised LNG is removed from the slurry under gravity increasing the concentration of the solids in the slurry to produce a slurry that is highly concentrated in solids, hereinafter referred to throughout this specification as a "slush". More preferably, the transfer means is inclined at an angle not less than 60° to the horizontal reference plane. Preferably, the transfer means is provided with an external drive.

Preferably, the material of construction of an internal wall of the cooling vessel of the third or fourth aspect of the present invention is polished and, more preferably, highly polished.

Preferably, the material of construction of the internal wall of the cooling vessel of the third or fourth aspect of the present invention having a low thermal conductivity is anisotropic. The material of construction may be a metal oxide or a ceramic. More preferably, the material of construction is a single crystal. One suitable material of construction is sapphire.

BRIEF DESCRIPTION OF THE DRAWINGS

Preferred embodiments of the present invention will now the described, by way of example only, with reference to the accompanying drawings, in which.

DETAILED DESCRIPTION OF THE PREFERRED EMBODIMENTS OF THE INVENTION

Figure 1:
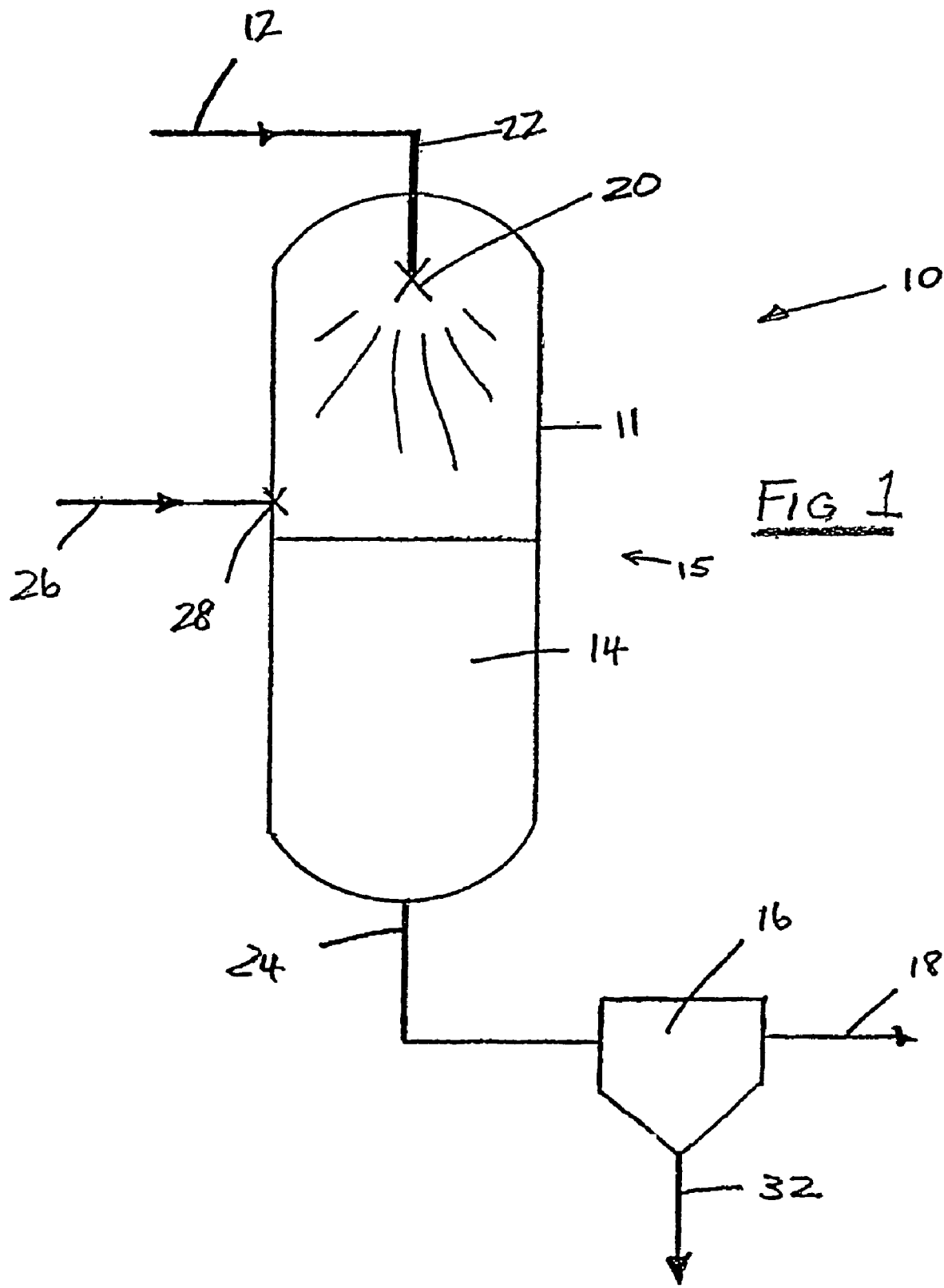
FIG. 1 is a schematic diagram of an apparatus for removing a freezable species from a natural gas feed stream in accordance with a first preferred embodiment of the present invention.

An apparatus 10 for removing a freezable species from a natural gas feed stream 12 is depicted in FIG. 1. The apparatus 10 includes a cooling vessel 11 in which the feed stream 12 is cooled to produce pressurised LNG.

Prior to its introduction to the cooling vessel 11, the natural gas feed stream 12 will typically be dried to produce a water content of less than 50 ppm. Any suitable process for drying the natural gas feed stream may be employed. One method of removing water from the natural gas feed stream is to use fixed-bed solid absorbents or other dehydration processes such as dehydration using glycol or methanol.

Another method of removing the water is to capture the water in gas/hydrate form. This method of removing water comprises cooling the natural gas by passing it over a cold surface at a temperature of −15° C. sufficient to freeze the water molecules adjacent to the gas contact surface so that ice in the form of hydrate is deposited on the gas contact surface along the gas flow path.

Whilst the natural gas feed stream would typically be dehydrated to remove water, this is not considered an essential step of the present invention and the natural gas feed stream 12 entering the cooling vessel 11 may contain water as one of the freezable species. The bulk of this discussion, however, will be centred on the removal of $CO_2$ as the freezable species. However, it is to be understood that the freezable species may include hydrogen sulphide, mercury and heavy hydrocarbons.

The temperature and pressure conditions of the natural gas feed stream 12 prior to the entry of the feed stream into the cooling vessel 11 must be such that the $CO_2$ and other freezable species are not allowed to form solids upstream of the cooling vessel 11. This is done by ensuring that the equipment upstream of the cooling vessel 11 is operated at a temperature typically in excess of −52° C.

By definition, under conditions conducive to form pressurised LNG within the cooling vessel 11, the freezable species present within the natural gas feed stream 12 will solidify. The region within the cooling vessel 11 in which the freezable solids solidify is referred to as the "solidification zone" 13. As depicted in each of FIGS. 1 to 4, the solidification zone 13 within the cooling vessel 10 is effectively an open space within the cooling vessel with no trays or plates or other physical barriers of any kind.

The material of construction of at least that part of the internal wall of the cooling vessel 11 in the area of the solidification zone 13 will be of any material able to withstand the process conditions of pressure and temperature required to perform liquefaction of the natural gas provided that the material has a sufficiently low thermal conductivity that the temperature is at all times cooler towards the centre of the cooling vessel than the temperature at the wall of the cooling vessel in solidification zone 13.

The freezable species will then preferentially form solids away from the wall of the cooling vessel 11 surrounding the solidification zone 13 due at least in part to the thermal gradient being maintained such that the temperature towards the centre of the cooling vessel is at all times less than the temperature at the walls.

In accordance with the first preferred embodiment of the present invention as illustrated in FIG. 1, the natural gas feed stream 12 is expanded into the cooling vessel 11 through a Joule-Thompson valve 20. The natural gas feed stream 12 is maintained at a constant pressure immediately upstream of the Joule-Thompson valve 20 to ensure controlled expansion of the natural gas from the pressure upstream of the cooling vessel at inlet pipe 22 to the lower pressure within the cooling vessel 11 following expansion through the valve 20.

Tests conducted by the applicant have shown that the optimum results for liquefaction are: obtained using an inlet gas pressure to the expansion valve 20 of between 200 and 600 psia. At these operating pressures, the temperature of the natural gas feed stream 12 upstream of the expansion valve 20 must not be allowed to fall below the critical temperature of −56° C. at which $CO_2$ begins to freeze.

In the case of the freezable species being hydrogen sulphide, the freezing point for pure $H_2S$ at 14.5 psia is 82.9°

C. Hydrogen sulphide has a vapour pressure of 271 psia at 20° C. It is thus understood that if $H_2S$ is present in the initial natural gas feed stream 12, solids of $H_2S$ will form solids in the cooling vessel 11 during liquefaction of the natural gas feed stream 12. In the case of mercury, even very low amounts of mercury in the natural gas feed stream is known to cause corrosion of the traditional material of construction of cooling vessels, namely aluminium alloys. Mercury-induced corrosion, particularly in the presence of water, has been known for some time, but the specific corrosion mechanism is not fully understood. Mercury removal from the natural gas feed streams is currently considered the only available remedy to the problem of mercury-induced corrosion during the liquefaction of natural gas.

Whilst a Joule-Thompson valve 20 is used in the first preferred embodiment of the present invention, any suitable expansion valve may be employed; for example, a turbo-expander or other means of isotropically expanding the gas into the cooling vessel 11 to effect cooling of the natural gas feed stream 12 into the cooling vessel 11. The process of expansion cools the natural gas feed stream 12 entering the cooling vessel 11 at the inlet 20 to between −100° C. and −125° C. The inlet pressure at the feed pipe 22 of between 200 to 600 psia is reduced to between 150 and 250 psia within the cooling vessel 11.

Figure 2:
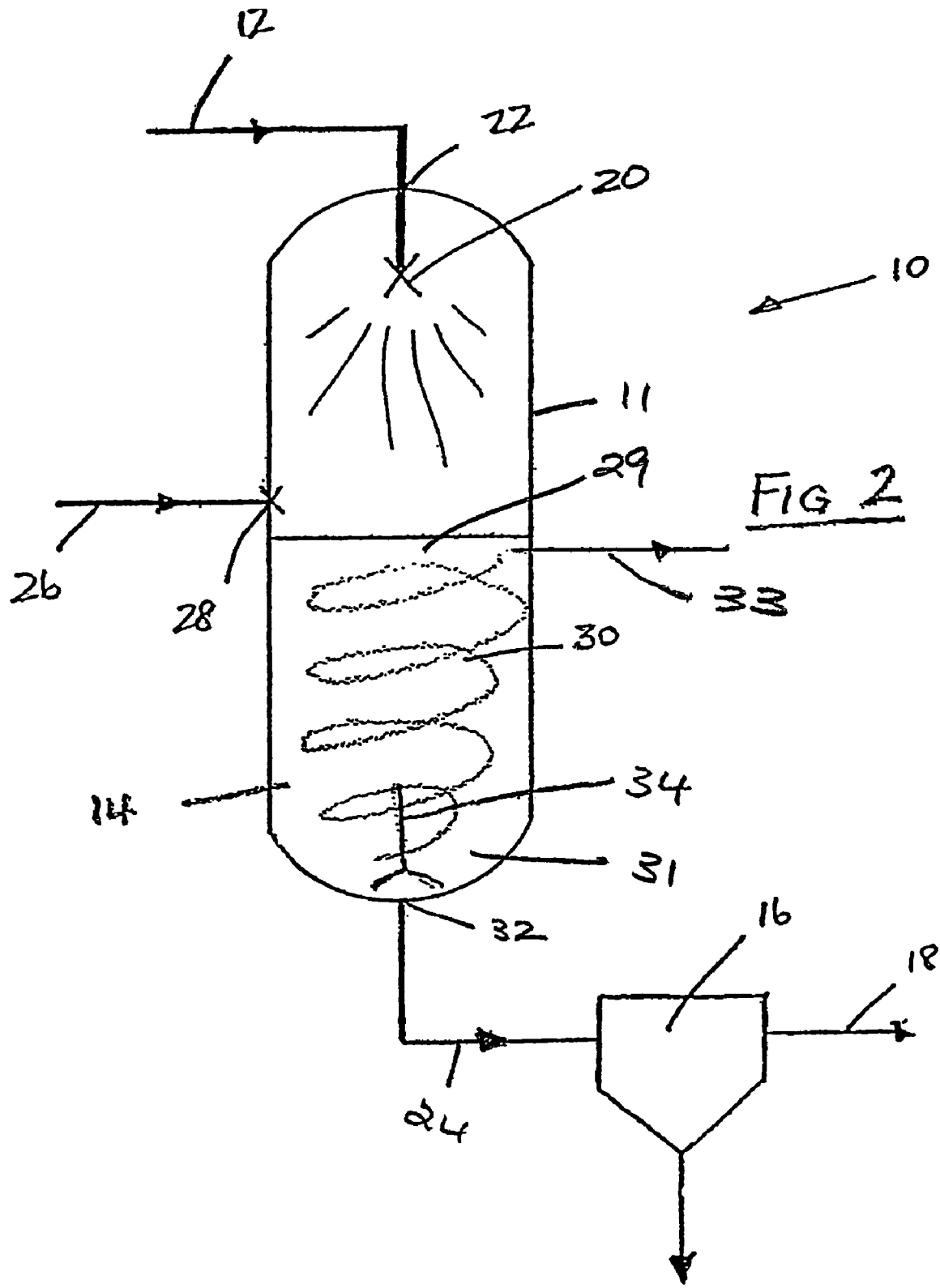
FIG. 2 is a schematic diagram of a cooling vessel including a stirrer for creating a vortex and a sub-cooled LNG stream in accordance with a second preferred embodiment

A second preferred embodiment of the present invention is depicted in FIG. 2. In this embodiment, a stream of sub-cooled LNG 26 is introduced to the cooling vessel 110 via a second inlet 28. The sub-cooled LNG stream 26 is introduced in part to assist in cooling the expanded natural gas feed stream 12 which is entered the cooling vessel 11 through the expansion valve 20 down to a temperature of at least −140° C. The natural gas feed stream 12 comprising the freezable species partially liquefies upon contact with the sub-cooled LNG stream 26 introduced by the second inlet 28. As LNG begins to form, by definition, solids of the freezable species also form creating a volume of pressurised LNG 14 within the cooling vessel 11.

Figure 4:
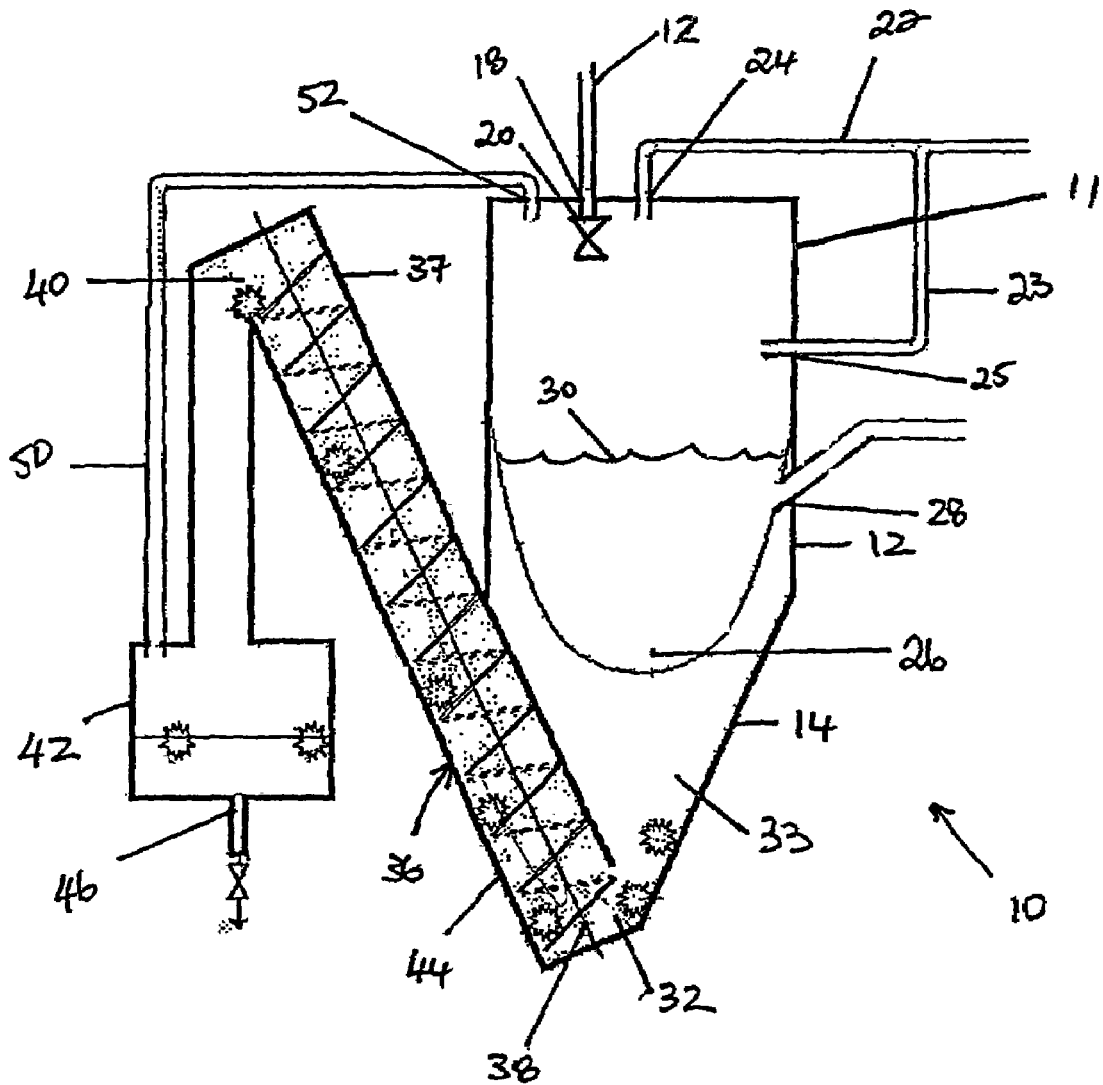
FIG. 4 is a schematic diagram of an apparatus in accordance with a fourth preferred embodiment of the present invention.

The sub-cooled LNG stream 26 may be recycled following separation of solids of the freezable species from the slurry removed from the cooling vessel 10 or be recycled from the product stream 30. Depending on the degree of sub-cooling required, the recirculating load of LNG to the recycle stream 22 may be many multiples of the amount required for customer use. A second recycle strewn 23 as depicted in FIG. 4 may be injected into the cooling vessel through an inlet 25 adapted to be tangential to and located near a top portion of the cooling vessel 10 to create the vortex 30 within the cooling vessel 10.

The second inlet 28 may be adapted to be tangential to the cooling vessel 11. With a tangential second inlet 28 a vortex 30 is created within the volume of pressurised LNG 14 in the cooling vessel 11. It has been found that best results for creating the vortex is achieved when the second inlet 28 is located at or near the uppermost level 29 of the volume of the pressurised LNG 14.

Once solids of the freezable species form within the volume of the pressurised LNG 14, the volume of pressurised LNG 14 is referred to as a slurry.

The solids of the freezable species are more dense than the pressurised LNG. The solid state density of $CO_2$ is about 1.2 g/cm$^3$ compared with the density of LNG which is 0.44 g/cm$^3$. Thus the solid state density of $CO_2$, for example, is four times higher than that of LNG. The solids thus migrate under gravity towards the lowermost portion 31 of the cooling vessel 11 in the direction of the outlet 32.

The creation of a vortex 30 is understood to assist in accumulating solids of the freezable species towards the centre of the cooling vessel 11 and also to encourage the migration of the solids of the freezable species under gravity towards the outlet 32 at the bottom of the cooling vessel 11. It is understood that the creating of a vortex 30 encourages separation I the same way as the method of density separation occurring within a hydrocyclone.

The slurry thus becomes more concentrated in solids towards the outlet 32 than towards the uppermost level 29 of the volume of pressurised LNG 14 within the cooling vessel 11. Thus the highest purity of pressurised LNG produced within the cooling vessel 11 will be towards the uppermost level 29 of the volume of pressurised LNG 14. A product stream of pressurised LNG 33 is removed at or near the uppermost level 29 of the volume of pressurised LNG 14. The product stream 33 may be further cooled to a temperature and pressure suitable for the desired method of sport and may also be subject to additional solid separation stages (not shown) if required. Multiple cascaded separators may be required to provide the degree of separation needed. Such traditional separators may be provided either in series or in parallel.

It has been described above that one method of creating the vortex 30 within the volume of pressurised LNG 14 is to introduce the subcooled LNG stream 26 to the cooling vessel via a tangential second inlet 28. Another method of creating a vortex is to provide a stirrer or other suitable mechanical agitation means 34 preferably towards the lowermost level 31 of the cooling vessel 11 as depicted in FIG. 2.

The slurry 24 is removed from the cooling vessel 11 via outlet 32. Typically, the slurry 24 will be in the temperature range of −130° C. and −150° C. at a pressure of between 150 to 250 psia. Tests conducted by the applicant have indicated that for a natural gas feed stream containing 21% $CO_2$ at a temperature of −52° C. that has been cooled in an arrangement as depicted in FIG. 2, including the introduction of a sub-cooled LNG stream at a temperature of −160° C., resulted in the majority of the $CO_2$ forming solids which are removed at the outlet 32. In the tests conducted by the applicant, the concentration of the pressurised LNG product stream 30 was reduced down to a level of 0.2% $CO_2$.

Figure 3:
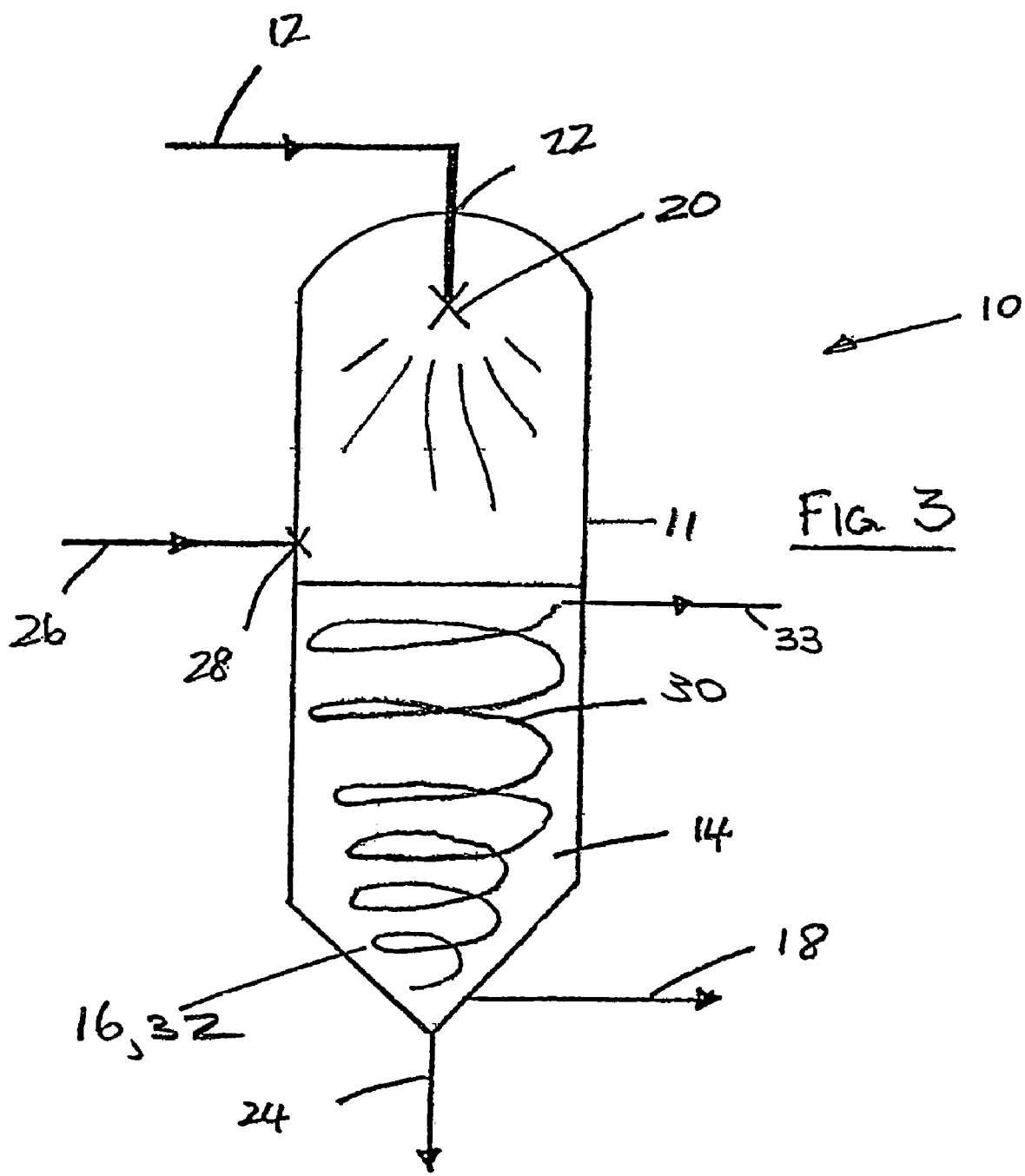
FIG. 3 is a schematic diagram representing a process of LNG liquefaction in accordance with a third embodiment of the present invention including an integral cyclone and a tangential inlet for introducing a sub-cooled LNG stream.

In the embodiment depicted in FIG. 2, the solids of the freezable species as separated from the slurry 24 using a cyclone 16. Whilst a cyclone is the preferred means for effecting solid-liquid separation, any suitable means for solid-liquid separation may be used such as a gravity separator or a combination of gravity and hydrocyclone methods. One or more cyclones 16 in series or parallel may also be employed downstream of the cooling vessel. In a third preferred embodiment of the present invention as depicted in FIG. 3, the slurry 24 is passed through a cyclone 16 which is an integral part of the cooling vessel 11 and forms the outlet 32.

In a fourth preferred embodiment of the present invention as depicted in FIG. 4, the cooling vessel 11 includes an integral hydrocyclone 16 through which the slurry 34 exits the cooling vessel 11. The slurry 34 is then transferred to a solids collection vessel 42 in fluid communication with the cooling vessel 110 via transfer means 36 in the form of a screw conveyor. Any suitable means for transferring of the slurry from the cooling vessel 11 to the solids collection vessel 42 may be employed, such as an incline screw conveyor 36, an auger or standard conveyor.

In accordance with the fourth preferred embodiment of the present invention, the slurry 34 is continuously removed from the cooling vessel 11 through the integral hydrocyclone 16. The solids collection vessel 42 and cooling vessel 10, as well as screw conveyor 36, are maintained at the same working pressure. In this way, continuous removal of the solids of the freezable species from the cooling vessel 11 may be effected.

The screw conveyor 36 may be driven either externally or internally by use of direct drive shaft 38. If the drive shaft 38 is located internally of the transfer means 36, the motor and gearbox for the drive shaft would be subjected to a continuous exposure to cryogenic pressures and temperatures and pressurised LNG which would preclude the use of rotating seals. It is understood that the reliability of rotating equipment at cryogenic temperatures is generally poor. In order to overcome this problem, an extended drive shaft may be employed such that the motor is external to the transfer means and not exposed to cryogenic temperatures and the working pressure of all three units. In any event, all seals used to drive the screw conveyor 36 must be able to withstand the working pressure of the transfer means, cooling vessel and solids collection unit.

The screw conveyor 36 is mounted at an angle to assist in the draining of LNG from the slurry. Typically the angle of inclination of the screw conveyor 36 is in the order of 60°. However, it is to be clearly understood that the exact angle of inclination of the screw conveyor 36 is not critical to the present invention. As the outlet slurry 32 is carried by the screw conveyor 36 to a level 37 higher than the liquid level 30 of the cooling vessel 10, a capillary action results in separation of the LNG from the slurry resulting in an increase in the concentration of solids within the slurry forming a slush 40.

The slush 40 is thus more concentrated in solids than the slurry 34 that leaves the cooling vessel 11. The slush 40 enters the solids collection vessel 42 and is then heated to convert the solids of the freezable species to a liquid form within the solids collection vessel 42. One suitable solids collection vessel would be a reboiler. Alternatively, the slush 40 collected in the solids collection vessel 42 may be heated by means of introducing a process stream at a higher temperature than that of the slurry stream entering the solids collection vessel 42.

A rotating roller (not shown) located at the exit of the hydrocyclone 16 may be used to create a seal between the cooling vessel 11 and the solids collection vessel 42. The solids collection vessel 42 would typically be clearance-fit with respect to its casing 44 to allow space for the LNG to drain. Best results are obtained when the screw conveyor 46 is arranged to be off-centre to provide the least clearance on the solids side while allowing plenty of space for the LNG to drain on the other side. A bush or bearing or other suitable rotation control means is provided at the top and bottom ends of the screw conveyor 36 to control its rotation and end thrust. For best results, the bottom bearing is such that the screw conveyor 36 is sealed at the bottom.

Once the solids collected in the solids collection vessel 42 are converted to liquid form, the liquefied freezable species is discharged through an outlet 46 of the solids collection vessel 42. The removal of the liquefied freezable species from the screw conveyor 42 via outlet 46 may be either conducted on a continuous basis or as a batch operation, depending on the level of the slush 40 in the reboiler 42. The outlet stream of the liquefied freezable species may be used for heat recovery or injected back into a disposal well. In particular, liquefied $CO_2$ may be used to advantage for other heat exchangers required in other sections of the LNG plant. Alternatively, the liquefied $CO_2$ may be used for a seabed heat exchanger as a cost-effective alternative to recompression equipment.

During the step of heating to convert the solids of the freezable species to liquid form, the LNG remaining in the slush 40 is driven off as a natural gas vapour stream 50. The natural gas vapour stream 50 may then be returned to the cooling vessel 11 via inlet 52. To minimise the quantity of vapour fed to the cooling vessel natural gas through inlet 52, it is important that the maximum possible amount of LNG is allowed to drain from the slurry 34 entering the screw conveyor 36 before the slush 40 enters the solids collection vessel 42.

The reboiler 42 may be heated using electrical heating controlled via thermostat. The nominal working pressure of the cooling vessel being 200 psia, the thermostat would be set at −30° C. in order to convert solids of $CO_2$ to liquid. The heating system used to heat the reboiler 42 should be designed so as to gently warm the slush 40 to avoid hot spots forming within the slush. A stirrer (not shown) may be provided within the reboiler 42 to avoid such hot spots forming within the heated slush.

In order to facilitate continuous removal of the freezable species, the working pressure of the solids collection vessel 42, transfer means 36 and cooling vessel 11 must be maintained at the same working pressure. It is highly desirable that the working pressure be maintained above the triple-point pressure of the freezable species. In the case of $CO_2$, the triple-point pressure at the temperatures of liquefaction will be in the order of 75 psia. In normal operation the cooling vessel 11 along with the solids collection vessel 42 and transfer means 36 should be operated at a pressure of around 200 psia. If the solids of the freezable species are allowed to melt at pressures below the triple-point pressure of the freezable species, an undesirable vapour phase of the freezable species would be produced.

The cooling vessel 11 is constructed in such a way that at least that part of the internal wall of the cooling vessel 11 surrounding solidification zone 13 is constructed from a material having a low heat transfer coefficient. Such a choice of materials of construction for the cooling vessel is a radical departure from convention material selection practice for liquefaction of natural gas. Selecting the material of construction having a low heat transfer coefficient for at least that part of the cooling vessel that surrounds the solidification zone 13 results in a thermal gradient within the cooling vessel 11 whereby the temperature towards the centre of the cooling vessel 11 is at all times cooler than the temperature at the walls of the cooling vessel 11.

In accordance with classical nucleation theory, solids form preferentially under conditions that result in the greatest possible reduction in the overall energy of the system. In the absence of special conditions, solidification would typically occur at the walls of the cooling vessel as solidification of the surface requires less surface area per unit volume to form a solid particle than does the nucleation of a solid away from a surface. Without wishing to be bound by theory, it is understood that several mechanisms within the cooling vessel are contributing to the formation of solids away from the walls of the cooling vessel.

The prototype cooling vessel constructed by the applicant for testing of the present invention was constructed of highly polished synthetic single crystal sapphire. Sapphire was chosen in order to provide a means for observing the solidification of the freezable species within the cooling vessel. A surprising outcome of the observations was that the choice of single crystal sapphire as the material of construction resulted in solids forming away from the walls of the cooling vessel 11. It is to be clearly understood, however, that the present invention is not limited in its scope to the selection of sapphire as the material of construction of the cooling vessel. Any other suitable material having a low heat transfer coefficient is sufficient Such a material may be a metal oxide or a ceramic such as partially stabilised zirconia.

The particular material of construction used during testing had a high level of anisotropy. It is understood that this property of an anisotropic growth habit of the single crystal is understood to have been one of the other factors that contributed to discouraging solids formation occurring at the walls of the cooling vessel. Additionally, the single crystal sapphire was highly polished and a polished sapphire surface is ranked as one of the smoothest known amongst any material. It is considered that polishing of at least the internal surface of the material of construction of the wall in the solidification zone is one of the factors that contributes to solids forming preferentially away from the walls of the cooling vessel.

It is understood that yet another factor encouraging solid formation to occur away from the walls of the cooling vessel is the differential surface tension that arises due to the thermal gradient that is induced within the cryogenic liquid. A liquid at a lower temperature is known to have a higher surface tension than a liquid at a higher temperature. By constructing at least part of the wall surrounding the solidification zone from a material having a low heat transfer coefficient, the temperature of the LNG is cooler towards the centre of the cooling vessel and thus the surface tension of the liquid towards the centre of the cooling vessel is higher. Again, to encourage an overall reduction in the energy of the system, the formation of solids towards the centre of the cooling vessel is encouraged.

It is worth noting that solids were observed to form on the walls of the cooling vessel when a vortex was not created within the pressurised LNG. However, the solids were a very low percentage of the overall solids formed within the cooling vessel and exhibited a planar growth habit The solids forming on the walls were readily detached from the walls with detachment being observed to occur due to thermocapillary motion of the fluid itself within the cooling vessel, even if a vortex was not created. When a vortex was created within the volume of pressurised LNG within the cooling vessel, solids of the freezable species were not observed at any time to form on the walls of the cooling vessel.

Examples of the test work conducted using the Sapphire Cell will now be described in order to provide a better understanding of the present invention. These examples are not to be taken as limiting the invention in any way and are provided for illustrative purposes only.

EXAMPLES

Tests were conducted on a feed gas containing 25% $CO_2$ introduced at 280 psia and $-140°$ C. Using the method described above, the $CO_2$ content was reduced from 25% to 0.29%. The feed gas contained the following:

| Component | Mole Fraction |
| --- | --- |
| $N_2$ | 1.939 |
| $CO_2$ | 24.95 |
| C1 | 64.64 |

-continued

| Component | Mole Fraction |
| --- | --- |
| C2 | 5.493 |
| C3 | 2.385 |
| $IC_4$ | 0.239 |
| $NC_4$ | 0.292 |
| $IC_5$ | 0.038 |
| $NC_{5+}$ | 0.023 |

Note:
The gas includes parts per million amounts of mercaptans.

After testing, the GC analysis of the LNG produced following separation of the solid contaminants at 145 psia and $-140°$ C. reads as follows:

| Component | Mole Fraction |
| --- | --- |
| $N_2$ | 1.28 |
| $CO_2$ | 0.29 |
| C1 | 94.65 |
| C2 | 4.48 |
| C3 | 2.02 |
| $IC_4$ | 0.21 |
| $NC_4$ | 0.27 |
| $IC_5$ | 0.04 |
| $NC_{5+}$ | 0.03 |

The mole fraction of $CO_2$ has been reduced substantially from 24.95% in the feed stream to only 0.29% in the LNG outlet stream. The solids collected had the following composition:

| Component | Mole Percentage |
| --- | --- |
| $CO_2$ | 95.37 |
| C1 | 0.37 |
| C2 | 0.06 |
| C3 | 0.66 |
| $IC_4$ | 0.90 |
| $NC_4$ | 1.92 |
| $IC_5$ | 0.36 |
| $NC_5$ | 0.24 |
| $C_6$ | 0.11 |

It will be readily apparent to a person skilled in the relevant art that the present invention has significant advantages over the prior art including, but not limited to, the following:

a) a low cost liquefaction and refrigeration process which significantly enhances the economics of small scale PLNG production;

(b) small-scale LNG plants based on the process of the present invention become competitive with large-scale projects on a specific capital cost basis ($/tpy) and on a total production cost basis ($/GJ);

(c) A wide variation in feed gas compositions can be processed; and (d) the process is simpler to operate and maintain than the conventional pre-treatment process.

Now that an embodiment of the present invention has been described in detail, it will be apparent to those skilled in the relevant arts that numerous modifications and variations may be made without departing from the basic inventive concepts. In particular, whilst accommodation of a hydrocyclone fitted to the bottom of the cooling vessel in combination with an inclined auger and reboiler have been described in the preferred embodiment of the present invention, other means for removing the solids from the bottom of the cooling vessel and separating the solids may be used and equally fall within the scope of the present invention. For example, a rotating high gravity separator in the form of a centrifuge may be provided for continuous separation of the liquid/solid mixture. The solid/liquid separation may then be achieved using filtration; for example, by means of a particle trap provided with the rotary scraper. Also, while the technology is particularly intended for use for small-scale LNG production facilities, it is equally applicable to large-scale and offshore LNG production. All such variations and modifications are to be considered within the scope of the present invention, the nature of which is to be determined from the foregoing description.

The invention claimed is:

1. A method for removal of a freezable species from a gaseous natural gas feed stream, the method comprising:
   cooling the feed stream in a cooling vessel to produce pressurised LNG in a manner such that the freezable species solidify forming a slurry with the pressurised LNG, wherein the step of cooling is conducted so as to maintain a temperature gradient within the cooling vessel such that the temperature towards the center of the cooling vessel is less than the temperature at the wall of the cooling vessel; and,
   removing the slurry from the cooling vessel whilst maintaining the freezable species as a solid.

2. A method for removal of a freezable species as defined in claim 1 further comprising the step of separating the solids of the freezable species from the slurry.

3. A method for removal of a freezable species as defined in claim 2 wherein the step of removing the slurry from the cooling vessel is conducted simultaneously with the step of separating the freezable species from the slurry.

4. A method for removal of a freezable species according to claim 1 further comprising the step of recycling to the cooling vessel LNG from which the freezable species has been separated.

5. A method for removal of a freezable species according to claim 1 further comprising the step of liquefying the separated solid of the freezable species.

6. A method for removal of a freezable species as defined in claim 5 wherein further comprising the step of recycling to the cooling vessel natural gas from which the freezable species has been separated during the step of liquefying.

7. A method for removal of a freezable species according to claim 1 further comprising the step of creating a vortex within the cooling vessel.

8. A method for removal of a freezable species as defined in claim 7 wherein the vortex is created by stirring the slurry.

9. A method for removal of a freezable species according to claim 7 wherein the vortex is created by one or both of (a) stirring the slurry; and, (b) introducing a fluid stream tangentially to the cooling vessel.

10. A method for removal of a freezable species as defined in claim 9 wherein the fluid stream introduced tangentially to the cooling vessel is a stream of sub-cooled LNG.

11. A method for removal of a freezable species as defined in claim 10 wherein the stream of sub-cooled LNG may be the sub-cooled LNG stream recycled after separation of the freezable species from the slurry.

12. A method for removal of a freezable species according to claim 1 wherein the step of cooling comprises the step of isotropically expanding the feed stream.

13. A method for removal of a freezable species according to claim 4 wherein the step of cooling comprises one or both of (a) isotropically expanding the feed stream; and, (b) introducing a stream of sub-cooled LNG.

14. A method for removal of a freezable species as defined in claim 13 wherein the stream of sub-cooled LNG is the stream of recycled LNG separated from the slurry during the step of separating the solids of the freezable species.

15. A method for the continuous removal of a freezable species from a gaseous natural gas feed stream comprising:
   cooling the feed stream in a cooling vessel to produce pressurised LNG in a manner such that the freezable species solidify forming a slurry with the pressurised LNG, wherein the step of cooling is conducted so as to maintain a temperature gradient within the cooling vessel such that the temperature towards the center of the cooling vessel is less than the temperature at the wall of the cooling vessel; and,
   separating the solids of the freezable species from the slurry, wherein the step of cooling and the step of separating are conducted at the same working pressure.

16. A method for the continuous removal of a freezable species as defined in claim 15 wherein the steps of cooling and separating are conducted at the same pressure in use.

17. A method for the continuous removal of a freezable species as defined in claim 15 further comprising the step of heating the separated solids of the freezable species to form a liquid of the freezable species.

18. A method for the continuous removal of a freezable species as defined in claim 17 wherein the steps of cooling, separating and heating are conducted at the same pressure in use.

19. A method for continuous removal of a freezable species as defined in claim 16 wherein the pressure is maintained at all times below the triple-point pressure of the freezable species.

20. A method for continuous removal of a freezable species as defined in claim 15 further comprising the step of removing the slurry from the cooling vessel.

21. A method for continuous removal of a freezable species as defined in claim 20 wherein the step of removing the slurry from the cooling vessel is conducted simultaneously with the step of separating the freezable species from the slurry.

22. A method for continuous removal of a freezable species as defined in claim 15 further comprising the step of recycling to the cooling vessel LNG from which the freezable species has been separated.

23. A method for continuous removal of freezable species as defined in claim 15 further comprising the step of liquefying the separated solid of the freezable species.

24. A method for continuous removal of a freezable species as defined in claim 23 wherein further comprising the step of recycling to the cooling vessel natural gas from which the freezable species has been separated during the step of liquefying.

25. A method for continuous removal of a freezable species as defined in claim 15 further comprising the step of creating a vortex within the cooling vessel.

26. A method for continuous removal of a freezable species as defined in claim 25 wherein the vortex is created by stirring the slurry.

27. A method for continuous removal of a freezable species as defined in claim 25 wherein the vortex is created by one or both of (a) stirring the slurry; and, (b) introducing a fluid stream tangentially to the cooling vessel.

28. A method for continuous removal of a freezable species as defined in claim 27 wherein the fluid stream introduced tangentially to the cooling vessel is a stream of sub-cooled LNG.

29. A method for continuous removal of a freezable species as defined in claim 28 wherein the stream of sub-cooled LNG may be the sub-cooled LNG stream recycled after separation of the freezable species from the slurry.

30. A method for continuous removal of a freezable species as defined in claim 15 wherein the step of cooling comprises the step of isotropically expanding the feed stream.

31. A method for continuous removal of a freezable species as defined in claim 15 wherein the step of cooling comprises one or both of (a) isotropically expanding the feed stream; and, (b) introducing a stream of sub-cooled LNG.

32. A method for continuous removal of a freezable species as defined in claim 31 wherein the stream of sub-cooled LNG is the stream of recycled LNG separated from the slurry during the step of separating the solids of the freezable species.

33. An apparatus for removing a freezable species from a natural gas feed stream, the apparatus comprising:
a cooling vessel having a solidification zone therewithin wherein a part of the cooling vessel that surrounds the solidification zone is constructed from a material having a low thermal conductivity;
an inlet for introducing the feed stream to the cooling vessel; and,
an outlet for removing a slurry of solidified freezable species and pressurised LNG from the cooling vessel.

34. An apparatus for removing a freezable species as defined in claim 33 further comprising a solid/liquid separator for separating the solidified freezable species from the slurry.

35. An apparatus for removing a freezable species as defined in claim 34 wherein the separator is located at and/or defines the outlet.

36. An apparatus for removing a freezable species as defined in claim 34 wherein the separator may be one of a plurality of separators arranged in series or in parallel.

37. An apparatus for removing a freezable species as defined in claim 33 further comprising an expansion valve located at and/or defining the inlet for introducing the feed stream to the cooling vessel.

38. An apparatus for removing a freezable species as defined in claim 37 wherein the expansion valve is a Joule-Thompson valve.

39. An apparatus for removing a freezable species as defined in claim 33 further comprising a stirrer for creating a vortex within the cooling vessel in use.

40. An apparatus for removing a freezable species as defined in claim 33 wherein the inlet is configured to introduce the feed stream tangentially to an internal wall of said cooling vessel.

41. An apparatus for removing a freezable species as defined in claim 33 wherein the material of construction of an internal wall of the cooling vessel is polished.

42. An apparatus for removing a freezable species as defined in claim 41 wherein the internal wall is highly polished.

43. An apparatus for removing a freezable species as defined in claim 33 wherein the material of construction of an internal wall of the cooling vessel is anisotropic.

44. An apparatus for removing a freezable species as defined in claim 33 wherein the material of construction on an internal wall of the cooling vessel is a metal oxide.

45. An apparatus for removing a freezable species as defined in claim 33 wherein the material of construction of an internal wall of the cooling vessel is a ceramic.

46. An apparatus for removing a freezable species as defined in claim 33 wherein the material of construction of an internal wall of the cooling vessel is a single crystal.

47. An apparatus for removing a freezable species as defined in claim 33 wherein the material of construction of an internal wall of the cooling vessel is sapphire.

48. An apparatus for continuously removing a freezable species from a natural gas feed stream, the apparatus comprising:
a cooling vessel having a solidification zone therewithin wherein a part of the cooling vessel that surrounds the solidification zone is constructed from a material having a low thermal conductivity;
an inlet for introducing the feed stream to the cooling vessel;
an outlet for removing a slurry of solidified freezable species and pressurised LNG from the cooling vessel; and
a solids collection vessel in fluid communication with the cooling vessel.

49. An apparatus for continuously removing a freezable species as defined in claim 48 further comprising a transfer means for transferring the slurry from the cooling vessel to the solids collection vessel.

50. An apparatus for continuously removing a freezable species as defined in claim 49 wherein the transfer means is inclined at an angle.

51. An apparatus for continuously removing a freezable species as defined in claim 50 wherein the angle is not less than 60° to the horizontal reference plane.

52. An apparatus for continuously removing a freezable species as defined in claim 50 wherein the transfer means is provided with an external drive.

* * * * *